(Model.)

H. F. NEUMEYER.
WINDOW BEAD FASTENER.

No. 294,497. Patented Mar. 4, 1884.

WITNESSES:
Theo. G. Hoster
C. Sedgwick

INVENTOR:
H. F. Neumeyer
BY Munn & Co
ATTORNEYS.

UNITED STATES PATENT OFFICE.

HORACE F. NEUMEYER, OF MACUNGIE, PENNSYLVANIA.

WINDOW-BEAD FASTENER.

SPECIFICATION forming part of Letters Patent No. 294,497, dated March 4, 1884.

Application filed January 4, 1884. (Model.)

*To all whom it may concern:*

Be it known that I, HORACE F. NEUMEYER, of Macungie, in the county of Lehigh and State of Pennsylvania, have invented a new and Improved Window-Bead Fastener, of which the following is a full, clear, and exact description.

The object of my invention is to provide a new and improved device for fastening window-beads to the casing in such a manner that they can be removed and replaced and fastened readily.

The invention consists in the combination, with a screw held in the end of an aperture in the window-frame, of a bolt passed through the bead and provided at the inner end with hooks, which bolt is turned to engage the hooks with head on the screw at the end of the aperture.

Reference is to be had to the accompanying drawings, forming part of this specification, in which similar letters of reference indicate corresponding parts in all the figures.

Figure 1:
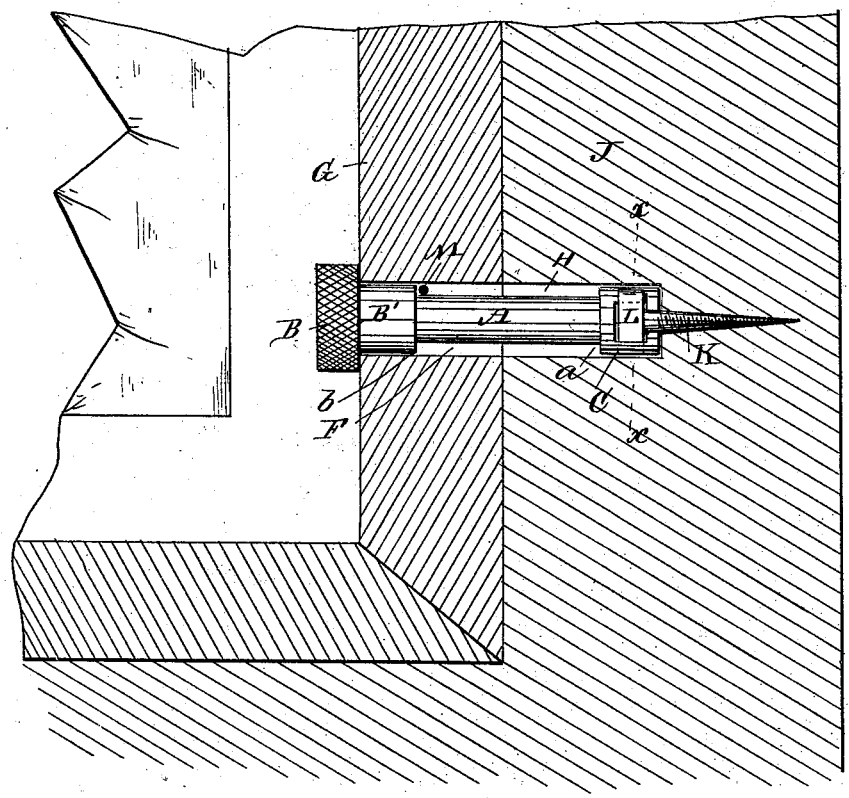
Figure 2:
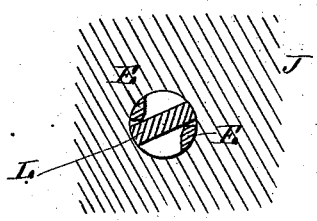
Figure 3:
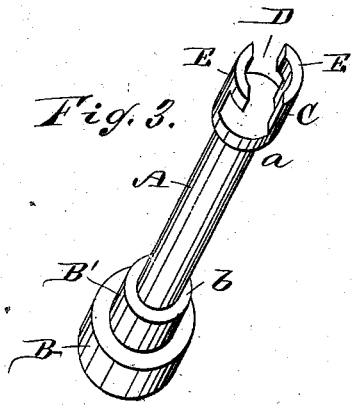

Figure 1 is a longitudinal elevation of my improved window-bead fastener, showing how it is used. Fig. 2 is a cross-sectional view on the line x x, Fig. 1. Fig. 3 is a perspective view of the bolt.

A bolt, A, is provided at one end with a milled head, B, and at the opposite end with a tubular head, C, having a transverse slit, D, forming two prongs, each of which has one end recessed to form two hook-prongs, E, on the end of the bolt. The head C is of greater diameter, so as to form an annular shoulder, a. Behind the head B the bolt is provided with an enlargement, B', which forms an annular shoulder, b. A hole, F, is made transversely through the bead G, and a hole, H, is made in a corresponding position in the window-casing J, at the inner end of which hole a screw, K, is held, which is provided with a cross-head, L, the thickness of which is such that the head can pass in between the prongs formed on the head C, and the height of the head is such that the head can pass into the notches of the hooks E. A brad or pin, M, is driven through the bead G in such a manner that it rests on the bolt A, adjoining the shoulder b, so that if the bolt A is withdrawn the shoulder a will strike against the brad M, and thus prevent withdrawing the bolt entirely from the hole F, but will permit withdrawing the bolt to such an extent that it does not project from the inner surface of the bead, thus permitting to slide the bead outward from the casing and parallel with the side of the said casing. After the bead has been placed against the casing, the bolt A is pushed inward until the head L on the screw K passes between the hook-shanks of the projecting head C. The bolt is given a quarter-turn, so as to cause the ends of the head L to pass into the notches of the hooks E and turn the screw K, thus holding the bolt in place and holding the bead against the casing. The bead can thus be fastened on the casing or released from the same very readily.

Having thus described my invention, what I claim as new, and desire to secure by Letters Patent, is—

1. A device for fastening window-beads, consisting of a bolt provided at its inner end with two hook-shanks, substantially as herein shown and described.

2. In a device for fastening window-stop beads, the bolt A, provided with the milled head B and the head C, having two hooks, E, and with the shoulders a and b, substantially as herein shown and described.

3. The combination, with a screw held in the end of an aperture in the sash-frame, and provided with a cross-head, of a bolt passed through the bead, which bolt is provided at its inner end with two hooks, substantially as herein shown and described.

4. The combination, with a screw, K, having a head, L, and held in the end of the aperture in the window-casing, of the bolt A, provided with hooks E at its inner end, and with shoulders a b, and of the brad or pin M, passed through the bead G, substantially as herein shown and described.

HORACE F. NEUMEYER.

Witnesses:
   E. R. LICHTENWALLNER,
   CHAS. O. MUTH.